US008542984B1

(12) United States Patent
Knee et al.

(10) Patent No.: US 8,542,984 B1
(45) Date of Patent: Sep. 24, 2013

(54) ADVANCED RECORDING OPTIONS FOR INTERACTIVE MEDIA GUIDANCE APPLICATION SYSTEMS

(75) Inventors: Robert A. Knee, Lansdale, PA (US); Reed S. Spiegel, Jr., Berwyn, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 1126 days.

(21) Appl. No.: 11/784,120

(22) Filed: Apr. 3, 2007

(51) Int. Cl.
  *H04N 5/761* (2006.01)
(52) U.S. Cl.
  USPC .......................................... 386/297; 386/293
(58) Field of Classification Search
  None
  See application file for complete search history.

(56) References Cited

U.S. PATENT DOCUMENTS

| | | | |
|---|---|---|---|
| 5,621,579 A | 4/1997 | Yuen | |
| 5,774,859 A | 6/1998 | Houser et al. | |
| 5,805,763 A | 9/1998 | Lawler et al. | |
| 7,646,962 B1 | 1/2010 | Ellis et al. | |
| 2001/0005903 A1* | 6/2001 | Goldschmidt Iki et al. | 725/50 |
| 2002/0174430 A1 | 11/2002 | Ellis et al. | |
| 2002/0174433 A1 | 11/2002 | Baumgartner et al. | |
| 2004/0078820 A1* | 4/2004 | Nickum | 725/58 |
| 2004/0107439 A1* | 6/2004 | Hassell et al. | 725/44 |
| 2004/0128685 A1 | 7/2004 | Hassell et al. | |
| 2004/0154040 A1* | 8/2004 | Ellis | 725/58 |
| 2006/0212904 A1* | 9/2006 | Klarfeld et al. | 725/46 |
| 2007/0154163 A1 | 7/2007 | Cordray | |
| 2007/0154168 A1* | 7/2007 | Cordray et al. | 386/83 |
| 2007/0157260 A1 | 7/2007 | Walker | |
| 2008/0104127 A1* | 5/2008 | Billmaier et al. | 707/200 |
| 2008/0155607 A1* | 6/2008 | Klappert | 725/58 |

FOREIGN PATENT DOCUMENTS

| | | |
|---|---|---|
| EP | 0 822 713 | 2/1998 |
| EP | 0 969 661 | 1/2000 |
| GB | 2 240 236 A | 7/1991 |
| JP | 05-101471 | 4/1993 |
| JP | 06-133334 | 5/1994 |
| JP | 10-091534 | 4/1998 |
| WO | WO 90/15507 | 12/1990 |
| WO | WO 92/22983 | 12/1992 |
| WO | WO 97/34413 | 9/1997 |

OTHER PUBLICATIONS

U.S. Appl. No. 11/241,523, Ellis et al.
U.S. Appl. No. 11/412,549, Ellis et al.
U.S. Appl. No. 11/635,148, Radloff et al.

* cited by examiner

*Primary Examiner* — Huy T Nguyen
*Assistant Examiner* — Eileen Adams
(74) *Attorney, Agent, or Firm* — Ropes & Gray LLP

(57) ABSTRACT

Systems and methods for advanced recording options in interactive media guidance applications pertaining to whether a program includes commercials, has a particular aspect ratio, is a director's cut, or is unrated. The interactive media guidance application receives a user input to search for and record a program with one or more recording attributes, including an input designating that an attribute be required, preferred, or preferred in multiple copies. In one method, the interactive media guidance application retrieves media guidance information data for the program from memory, determines if the program has the desired recording attribute, and if so, records the program. In another method, the interactive media guidance application records the first available program which has all required recording attributes, and then continues to search for and record more-preferred versions.

44 Claims, 9 Drawing Sheets

ADVANCED RECORDING OPTIONS FOR INTERACTIVE MEDIA GUIDANCE APPLICATION SYSTEMS

BACKGROUND OF THE INVENTION

This invention is directed to advanced recording options in interactive media guidance applications. Interactive media guidance applications, such as interactive television program guides, are well known in the art.

In recent years, many trends have challenged the functionality of existing interactive media guidance applications. For example, it has become common for studios to release multiple versions of a movie, e.g., widescreen versions, director's cuts, unrated versions. Similarly, it has become common for programs to be broadcast or made available in varying formats, often without commercial interruptions. Due to these and other trends, interactive media guidance applications may now encounter several different versions of the same program. The prevalence of these and other new program variations has created a need for more advanced recording options.

SUMMARY OF THE INVENTION

This invention is directed to systems for and methods of recording based on one or more of four different recording attributes. The four recording attributes indicate whether a program is: (1) the originally released version or some other release such as a director's cut; (2) a rated version or an unrated version; (3) a commercial-free version or one with commercials; or (4) presented in normal 4:3 aspect ratio, or some other aspect ratio such as 16:9 or 2.35:1 "widescreen." Once the user selects one or more of the above attributes, the interactive media guidance application will only record a program if it possesses those attributes. In some embodiments, a recording with any of these options may also be used to replace already recorded programs.

This invention is also directed to systems for and methods by which a user may designate one or more of the above recording attributes to be "preferred." In one embodiment, the interactive media guidance application records the first available version of that program, and then determines if it possesses all preferred attributes. If the recording does not possess all preferred attributes, the interactive media guidance application then searches for and records a more-preferred version, and deletes the less-preferred previous recording, i.e. replaces the previous recording with the newer, more-preferred recording.

In the above embodiment, if multiple programs are available at once, the interactive media guidance application will record the program that is most preferred based on its attributes. In each case, after the first recording, the interactive media guidance application will continue to search for and record more-preferred versions until it records a version of the program which possesses all the preferred attributes.

In another embodiment, the user may direct the interactive media guidance application to collect multiple copies of programs based on one or more of the recording attributes. In such a case, the interactive media guidance application searches for and records the first available version of the program. If multiple versions were available at once, and each possessed an attribute with regards to which the user prefers multiple copies, the interactive media guidance application would then attempt to record both. For example, if the user prefers multiple copies based on aspect ratio, the interactive media guidance application would record the first available program. Where that first available program was broadcast in normal 4:3 aspect ratio, the interactive media guidance application would then search for and record any other more-preferred versions of that program that were also in 4:3 aspect ratio, and replace the previous 4:3 recording. Additionally, the interactive media guidance system would search for and record any versions of that program that were in other aspect ratios (such as 16:9), but would only replace prior recordings that had the same aspect ratio. Thus, the interactive media guidance system would attempt to save one recording for each available aspect ratio which had all other preferred attributes.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Although the embodiments described below may refer to recording in broadcast digital or analog television systems, it is to be clearly understood that the systems and methods of the invention may be used with any suitable video or audio content (e.g., on-demand or recorded content) in any suitable media system (e.g., radio-frequency broadcast, cable, satellite, on-demand, and IPTV system).

Figure 1:
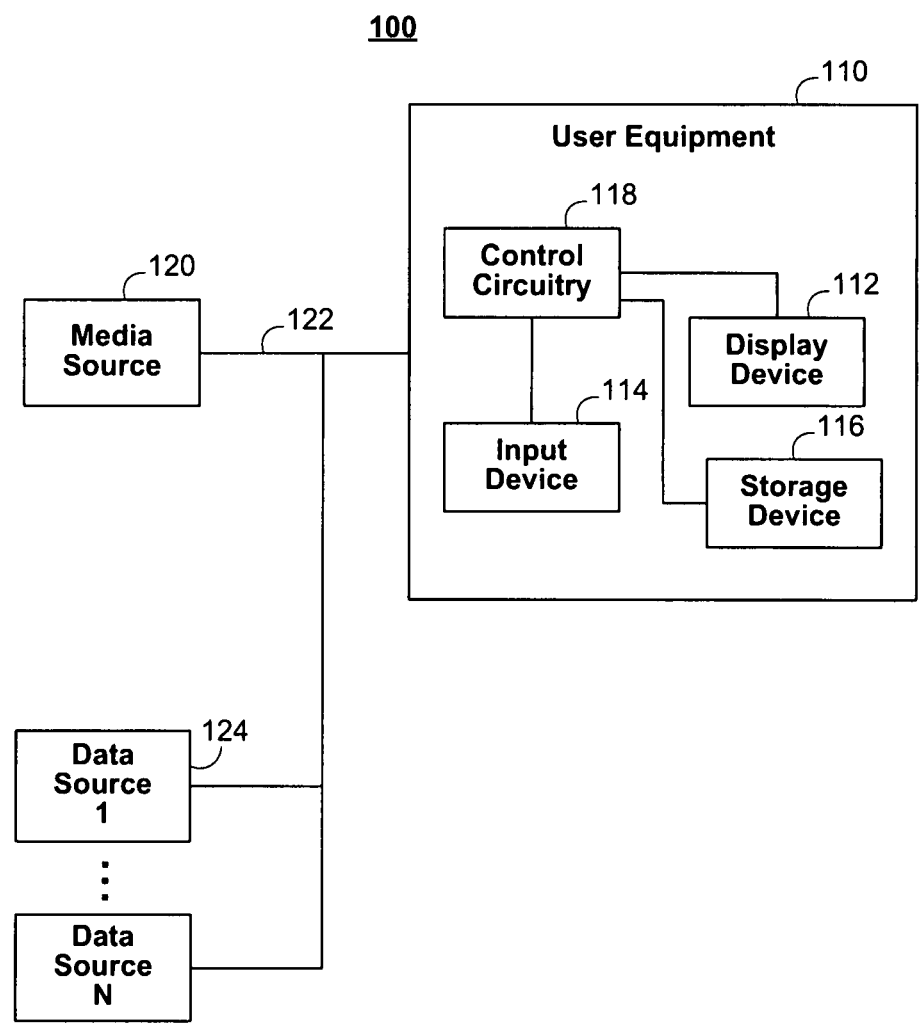
FIG. 1 is a diagram of an illustrative interactive media distribution system, in accordance with one embodiment of the present invention.

FIG. 1 shows illustrative interactive media distribution system 100 in accordance with one embodiment of the invention. User equipment 110 receives media in the form of signals from media source 120 over communications path 122. In practice there may be multiple media sources 120 and user equipment 110, as well as multiple communication paths 122, but only one of each has been shown in FIG. 1 to avoid over-complicating the drawing.

Media source 120 may be any suitable media source such as, for example, a cable system headend, satellite media distribution facility, media broadcast facility, Internet protocol television (IPTV) headend, on-demand server (e.g., VOD server), website, game service provider (e.g., for online gaming), or any other suitable facility or system for originating or distributing media. Media source 120 may be configured to transmit signals over any suitable communications path 122 including, for example, a radio-frequency broadcast path, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing the instructions of an interactive media guidance application such as, for example an online interactive media guidance application.

User equipment 110 may include any equipment suitable for providing an interactive media experience. User equipment 110 may include television equipment such as a television, set-top box, recording device, video player, user input device (e.g., remote control, keyboard, mouse, touch pad, touch screen or voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a fixed electronic device such as, for example, a gaming system (e.g., x-Box, PlayStation, or GameCube) or a portable electronic device, such as a portable DVD player, a portable gaming device, a cellular telephone, a PDA, a music player (e.g., MP3 player), or any other suitable fixed or portable device.

In the example of FIG. 1, user equipment 110 includes at least control circuitry 118, display device 112, user input device 114, and storage device 116 which may be implemented as separate devices or as a single device.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the interactive media guidance application. Display device 112 may also be configured to provide for the output of audio.

Storage device 116 may include a hard drive (e.g., one or more ATA, SCSI, IDE, or IEEE 1394 drives), digital video recorder (DVR), personal video recorder (PVR), or any other device capable of storing media content. Control circuitry 118 may access stored content (e.g., programs and movies) on storage device 116 and cause the content to be presented on display device 112 at any suitable time. Storage device 116 may include one or more tuners. In some embodiments, storage device 116 may be omitted. In other embodiments, storage device 116 may be at a remote location, for example a server co-located with media source 120 or data source 124.

Control circuitry 118 is adapted to receive user inputs from input device 114 and execute the instructions of the interactive media guidance application. Control circuitry 118 may include one or more tuners (e.g., analog or digital tuners), encoders and decoders (e.g., MPEG decoders), processors (e.g., Motorola 68000 or MIPS family processors), memory (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 118 may be included as part of one of the devices of user equipment 110 such as, for example, part of display 112 or any other device (e.g., a set-top box, television and video player).

Control circuitry 118 may direct tuners to tune, acquire, and decode any suitable content accessible by user equipment 110. For example, user equipment 110 may include both an analog tuner used to acquire analog television signals and a digital tuner used to acquire and decode digital television signals. Control circuitry 118 may store or buffer one or more frames of video from the tuners to memory or to storage device 116 at any suitable time. In addition, memory or storage device 116 may include one or more pre-stored buffers (e.g., circular buffers) of audio or video, graphics, advertising, or any other suitable content. Control circuitry 118 may cause the stored frames, pre-stored buffer, audio, or video to be displayed or presented on display device 112 at any suitable time (e.g., after some user input from user input device 114).

In some embodiments, user equipment 110 may also include graphics circuitry (e.g., incorporated within control circuitry 118). The graphics circuitry may include video and/or audio transcoding circuitry, one or more graphics processors, memory, and various display outputs (e.g., S-Video and composite video outputs). The graphics circuitry may also include video compression and scaling codecs or circuitry to scale the input from the tuners (or from some other device, such as storage device 116) to a resolution or size other than the input's native resolution or size. For example, using the graphics circuitry, the input to the tuners may be displayed at a smaller size on display device 112 than their native size in order for program listings information to be presented with the tuner content on the same display screen. As another example, the graphics circuitry may present full-motion or still frame thumbnail windows corresponding to one or more tuner inputs on the same display screen. The graphics circuitry may scale one video input at a time or scale more than one video input simultaneously. For example, in user equipment with two tuners the inputs of both of the tuners may be scaled simultaneously so that these inputs may be displayed together on the same display screen in real-time (perhaps with program listings information, content suggestions, or other suitable information).

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data sources 124. Any single user or household can have a plurality of instances of user equipment 110. But for the clarity of the figure, the equipment of only a single user is shown. The equipment of the plurality of users may be connected to media source 120 and data source 124 using a cable television network, a satellite television network, a local area network (LAN), a wireless network, the Internet, or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive television program guide. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application. In other embodiments, data sources 124 may provide data as to specific program attributes. In such embodiments, program attribute data may be used to enable advanced recording options based on the aspect ratio of a program, or whether a program is commercial-free, is a director's cut, or is unrated.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

Figure 2:
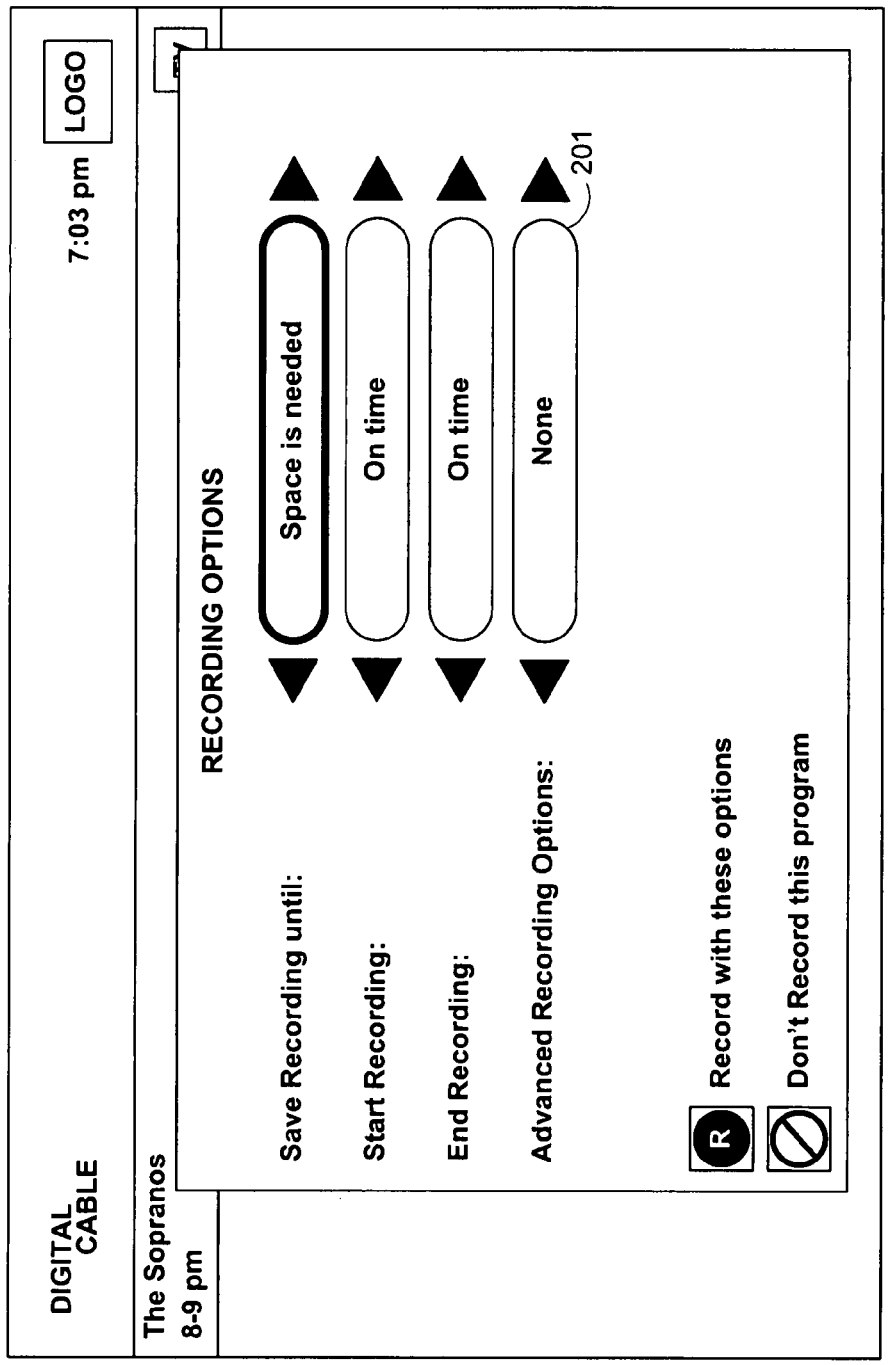
FIG. 2 shows an illustrative display screen showing a future recording options overlay accessed from the program guide, in accordance with one embodiment of the present invention.

FIG. 2 shows a recording options overlay which the interactive media guidance application may display on top of the program guide when a record request is made. In some embodiments, this overlay may be reached by selecting an option on one or more preceding overlays. In response to the selection of option 201, the interactive media guidance application may display additional overlay screens for advanced recording options (FIG. 5).

Figure 3:
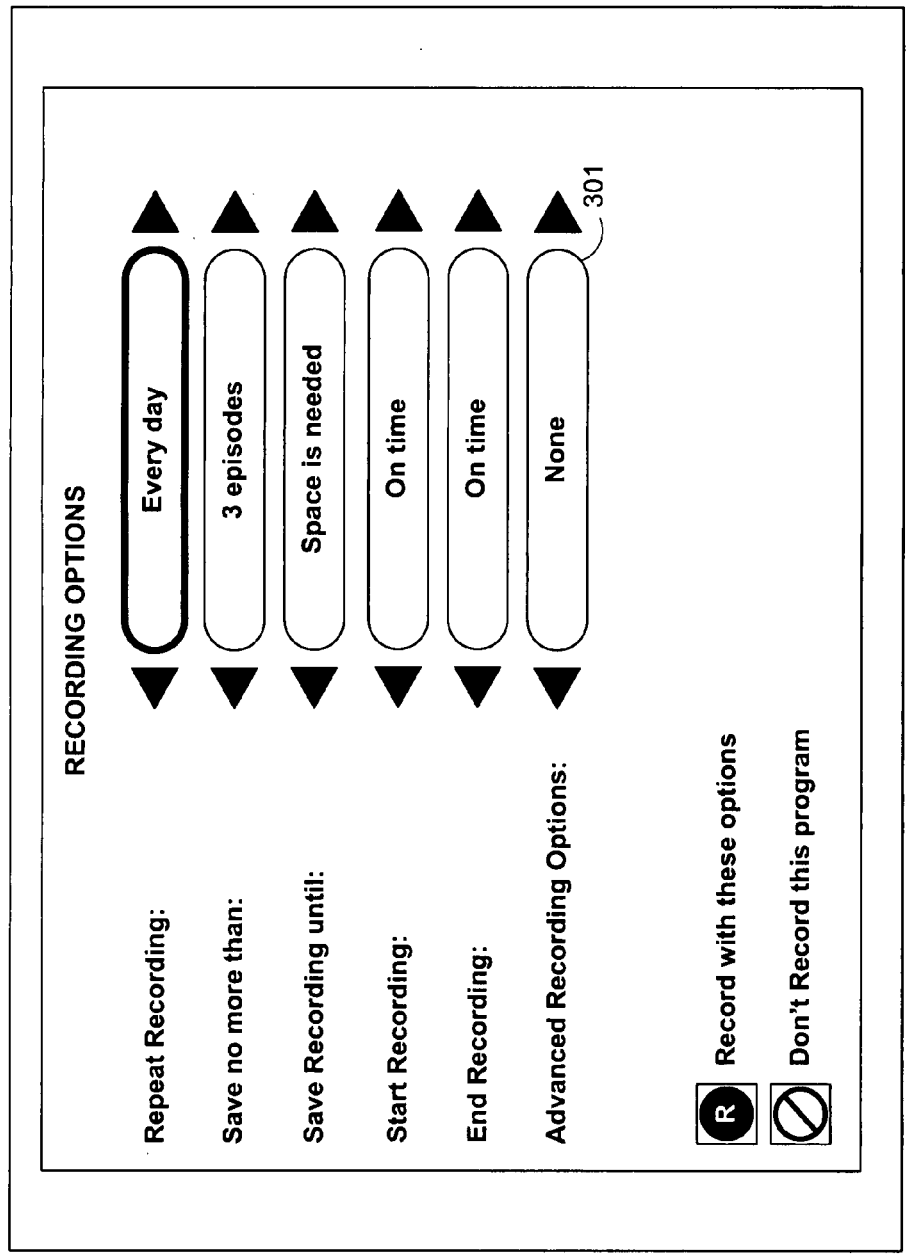
FIG. 3 shows an illustrative display screen showing a live recording options overlay accessed while viewing the program to be recorded, in accordance with one embodiment of the present invention.

FIG. 3 shows a recording options overlay which the interactive media guidance application may display on top of the program to be recorded when a record request is made. In some embodiments, this overlay may be reached by selecting an option on one or more preceding overlays. In response to the selection of option 301, the interactive media guidance application may display additional overlay screens for advanced recording options (FIG. 5).

Figure 4:
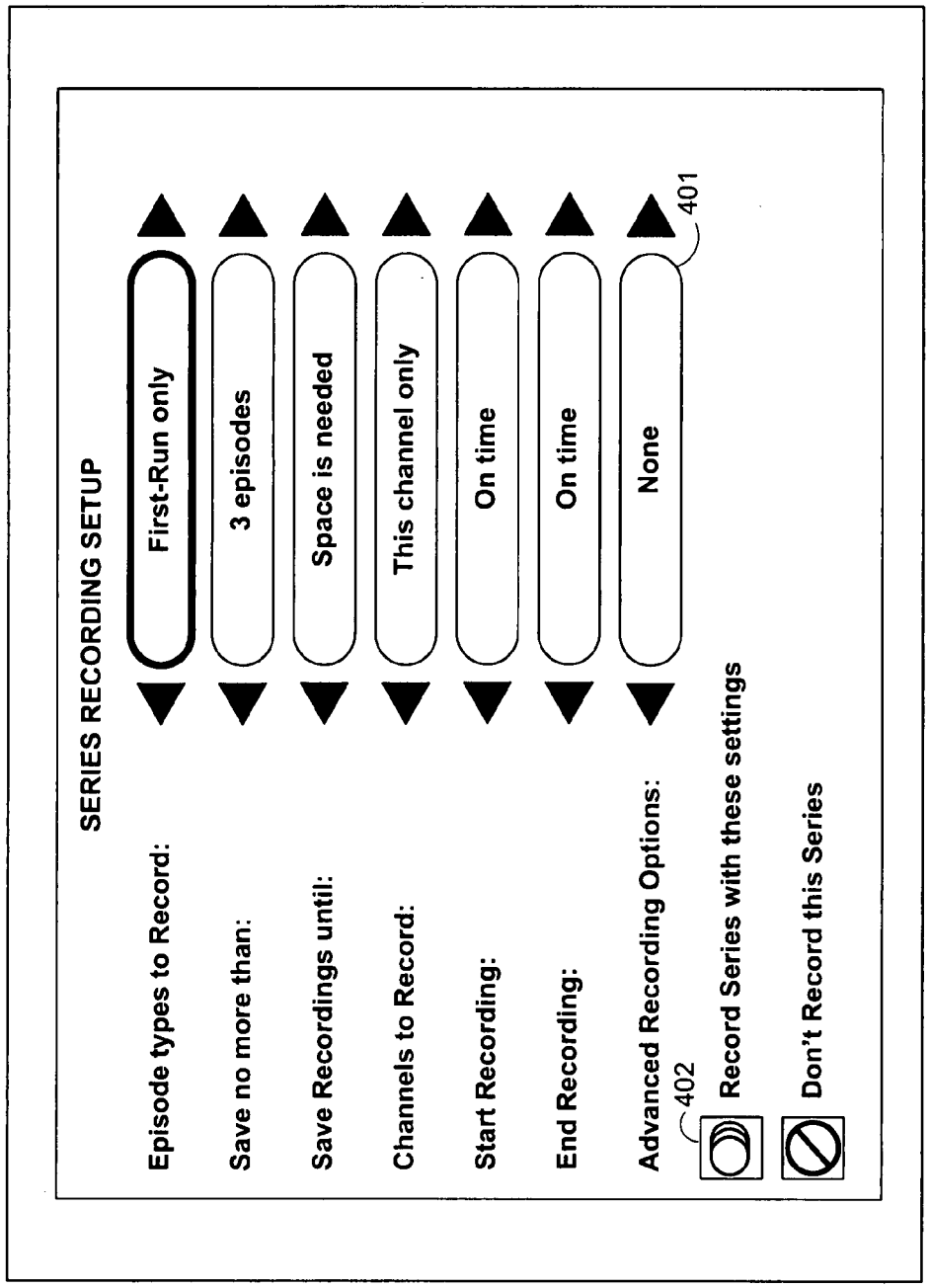
FIG. 4 shows an illustrative display screen showing a series recording options overlay, in accordance with one embodiment of the present invention.

FIG. 4 shows a series recording options overlay which the interactive media guidance application may display in response to a series recording request. In some embodiments, this overlay may be reached by selecting an option on one or more preceding overlays. In response to the selection of option 401, the interactive media guidance application may display additional overlay screens for advanced recording options (FIG. 5).

Figure 5:
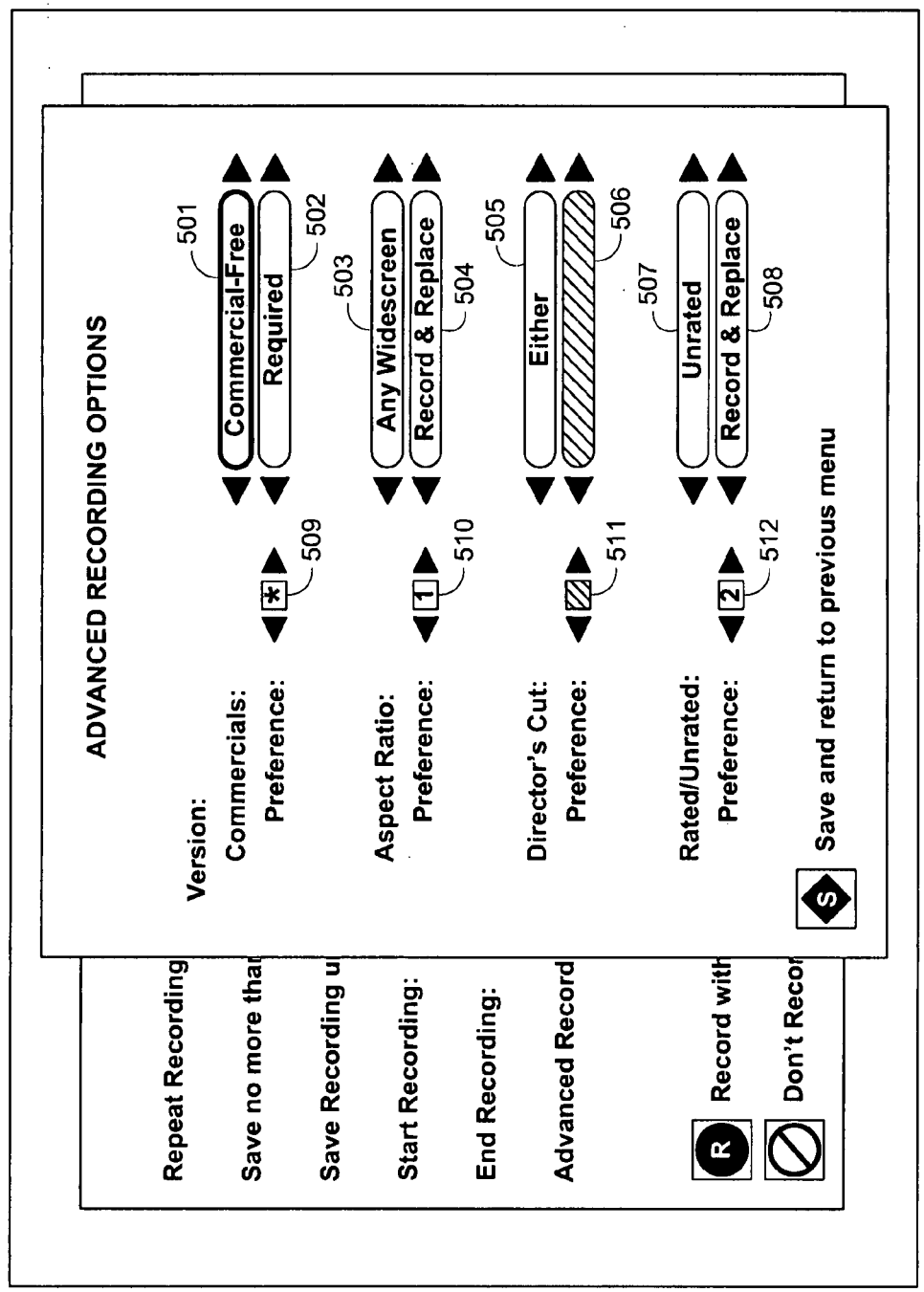
FIG. 5 shows an illustrative display screen showing an advanced recording options overlay, in accordance with one embodiment of the present invention.

FIG. 5 shows an advanced recording options overlay which the interactive media guidance application may display in response to the selection of options 201 or 301 from the recording options overlay (FIGS. 2 & 3) or option 401 from the series recording options overlay (FIG. 4), and which allows the user to designate whether the program or series to be recorded be commercial-free, of a certain aspect ratio, a director's cut, or unrated. In some embodiments, this overlay may be reached by selecting an option on one or more preceding overlays. This figure shows one possible embodiment, where the interactive media guidance application has displayed the advanced recording options overlay in response to the selection of an option in the recording options overlay. In other embodiments, the interactive media guidance application may display the advanced recording options overlay in response to options selected on other screens or through the use of a dedicated button on the user equipment 110, such as the remote control or set-top box.

In the example of FIG. 5, each attribute has two or more settings. For example, the aspect ratio attribute 503 may have settings for "any widescreen," 4:3, 16:9, 2.35:1, etc. Similarly, the commercials attribute 501 may have more settings than just "commercials" or "commercial-free" depending on the program. For example, if a program had commercials which played at the beginning or end, but had no commercial interruptions, there may be such a setting in the commercials attribute 501. In addition, if more than one director's cut or unrated version were released, there may be such a setting in either of the "directors cut" attribute 505 or "rated/unrated" attribute 507. Thus, in some embodiments, the available options for each recording attribute may be determined based on the program to be recorded. In other embodiments, the available options may be the same for all programs or for all programs of a certain type (e.g., sports, movies, sitcoms, etc.).

For the purposes of illustration, FIG. 5 shows an example where some attributes are required and others are preferred. Where, as here, there are multiple preferred attributes, each attribute is ranked in terms of its preference relative to the other attributes. Thus, a program version which has the attribute ranked "1" is more preferred than a version which only has the attribute ranked "2." In addition, some attributes may be set to "required," in which case the interactive media guidance application will not record any version of that program which does not possess that recording attribute.

Thus, in the example of FIG. 5, the commercial-free attribute 501 is accorded a preference 502 of "required." Therefore in this embodiment, the interactive media guidance application will not record any versions of the program which are not commercial free. By contrast, the aspect ratio attribute 503 is set to "any widescreen" and is accorded a "record & replace" preference 502 with value 510 of "1." Similarly, the Rated/Unrated attribute 507 is set to "unrated" and has been accorded a "record & replace" preference 508 with value 512 of "2." Thus, in this example, the interactive media guidance application will record the first available version of the program which is commercial-free, but then will seek to replace that initial version with a version which has one or more of the preferred attributes until it obtains a version which is commercial-free, widescreen, and unrated. Lastly, the "Director's Cut" attribute 505 is set to "either" and is not accorded a preference attribute 506 or value 511. Therefore, in this embodiment, the interactive media guidance application will not consider the director's cut attribute when determining whether to record a version of the program.

As an alternative example of FIG. 5, the "Director's Cut" attribute 505 (or the other attributes) may be set to "multiple copies" (i.e. preferred in multiple copies). In contrast with a preference setting of "either" (as explained above) where the interactive media guidance application will simply record the first available copy with any variant of that recording attribute (and only maintain one copy), a "multiple copies" setting directs the interactive media guidance application to collect one copy with each variant of that recording attribute. In other words, if the "Director's Cut" attribute 505 was set to "multiple copies" (i.e. preferred in multiple copies), the interactive media guidance application would record the first available director's cut version which has all required attributes, and the first available version which is not a director's cut which has all required attributes. It would then replace each of those copies with more preferred versions until it obtains two optimal versions: one which is commercial-free, widescreen, unrated, and a director's cut, and one which is commercial-free, widescreen, unrated, and not a director's cut. When an attribute has been designated as being preferred in multiple copies, if the user equipment has multiple tuners and if complementary copies are simultaneously available, they may be recorded simultaneously. For example, if the user prefers multiple copies of the aspect ratio attribute, and a normal aspect ratio and widescreen version are simultaneously broadcast on two channels, they may both be recorded.

In other embodiments, the advanced recording options may be set as defaults from this or another overlay. Additionally, the interactive media guidance application may infer preferred or required advanced recording options from the user's recording and viewing history. The overlay screens shown in FIGS. 2-5 are presented for purposes of illustration and not of limitation, and the present invention may be implemented through any suitable interface, with or without direct user input.

Figure 6:
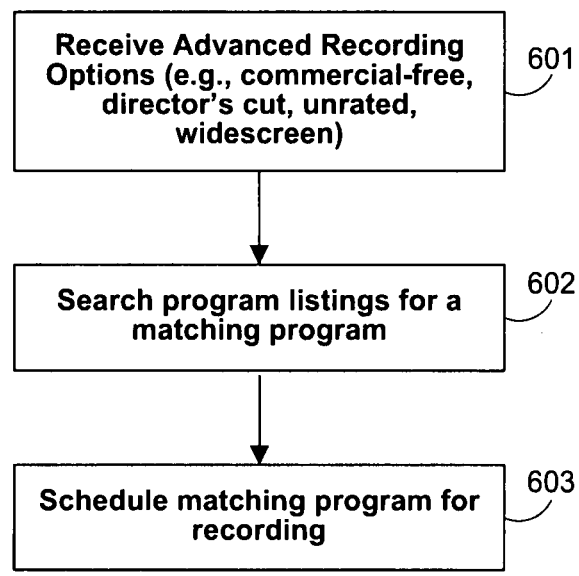
FIG. 6 shows a flow chart of an illustrative process for identifying and recording a program with advanced recording attributes, in accordance with one embodiment of the present invention.

FIG. 6 shows a flow chart of an illustrative process for recording based on advanced recording options. In step 601, the interactive media guidance application receives the advanced recording options. In this embodiment, the options would be required or not required (i.e. there are no options for "preferred," "record & replace" setting, or "multiple copies" settings). In step 602, the interactive media guidance application searches the program listings for a program which has all required attributes, and once found, schedules that program to be recorded in step 603 on storage device 116, on a remote storage (e.g., network DVR), or any other suitable location.

The above process for recording based on advanced recording options may apply to an individual program or a series. When applied to a series, steps 601-603 would be executed separately for each episode of the series.

Figure 7:
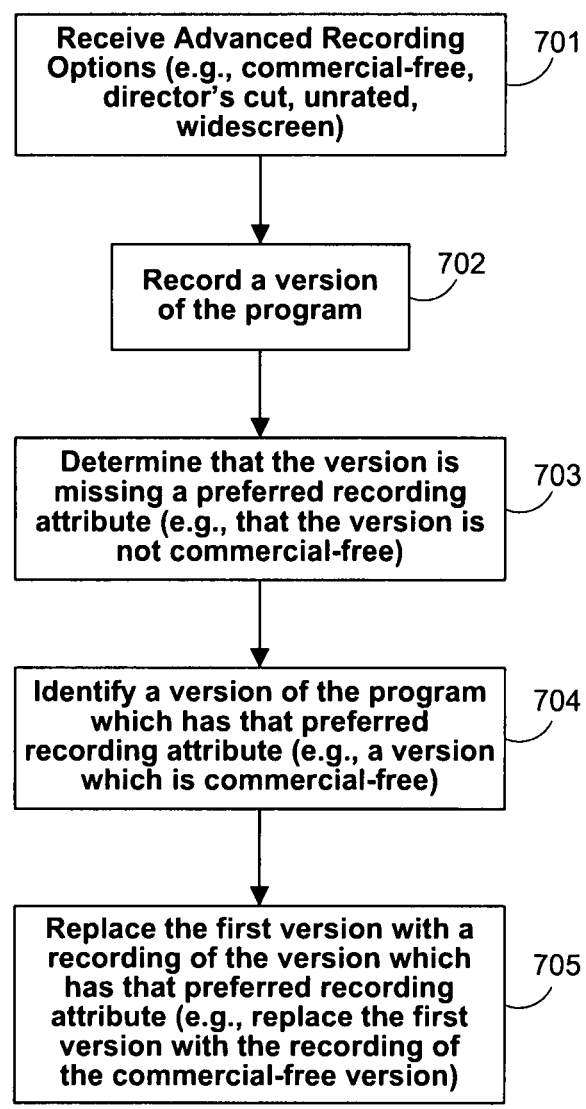
FIG. 7 shows a flow chart of an illustrative process for recording a less-preferred version of a program and then replacing that with a more-preferred version, in accordance with one embodiment of the present invention.

FIG. 7 shows a flow chart of an illustrative process for replacing a less-preferred version of a program with a more-preferred version based on a specific attribute. For example, the most-preferred version may be one that is commercial-free. However, this process may be used with any other recording attribute. In step 701, the interactive media guidance application receives the advanced recording options. In step 702, the interactive media guidance application records a copy of the desired program. In step 703, the interactive media guidance application assesses the recording to determine whether it has the preferred attribute. If it is not, in step 704, the interactive media guidance application identifies a version of the program which has that preferred attribute. Then, in step 705, the interactive media guidance application records the version with the preferred attribute and replaces the first recording with that newly-recorded version.

In other embodiments, the process shown in FIG. 7 may be ordered differently. For example, the interactive media guidance application may determine the program is not commercial-free prior to recording it. Then, it may search for a commercial-free version with which to replace the first recording. A similar example is shown in FIG. 8.

The above processes for replacing a less-preferred version of a program with a more-preferred version based on a specific attribute, may apply to an individual program or a series. When applied to a series, steps 701-705 would be executed separately for each episode of the series. In addition, in any of the above processes, if a recording is made, it may be recorded on storage device 116, on a remote storage (e.g., network DVR), or any other suitable location.

Figure 8:
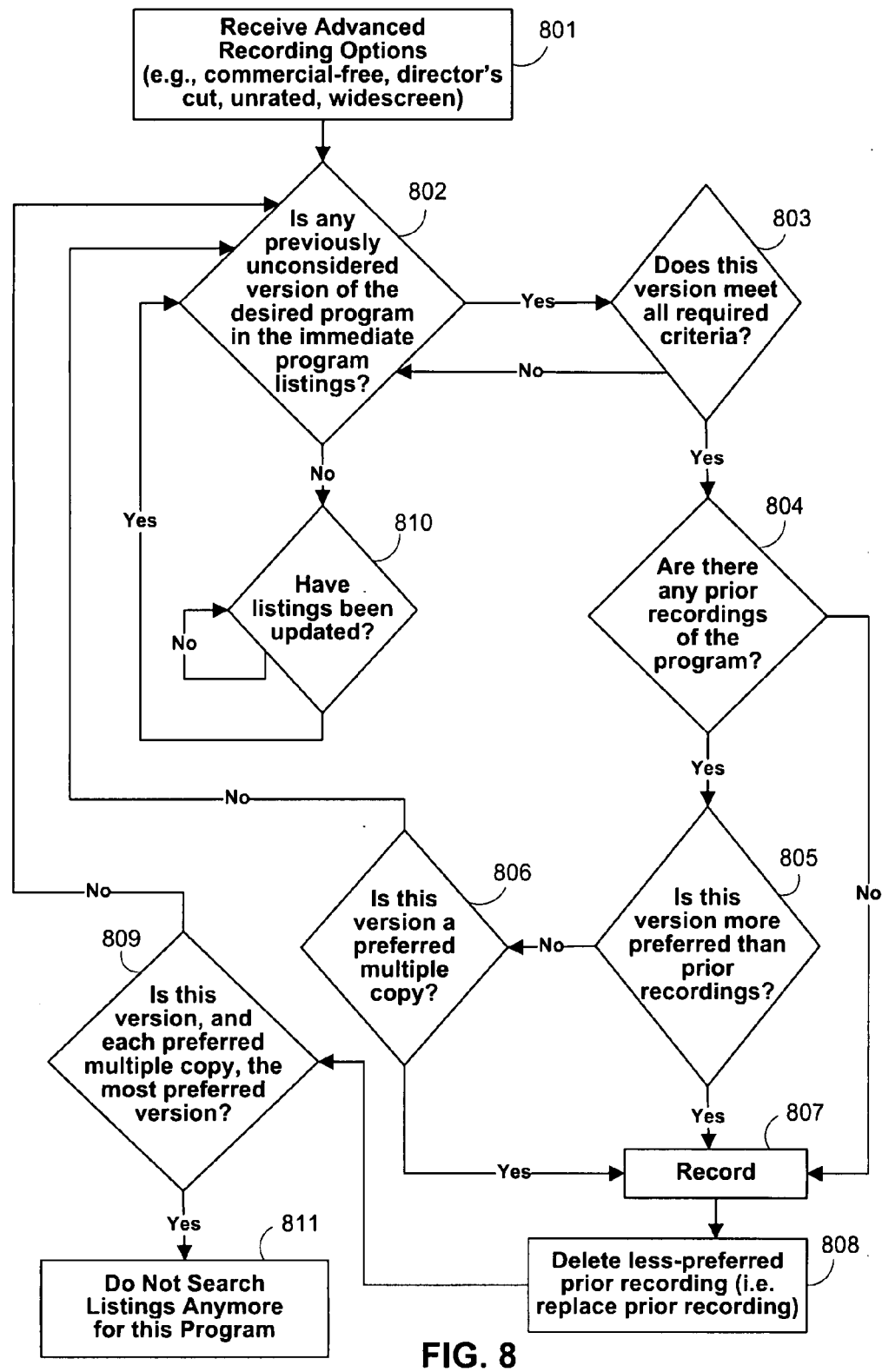
FIG. 8 shows a flow chart of an illustrative process for continually searching for and recording more-preferred versions of a program until the most-preferred version is obtained, in accordance with one embodiment of the present invention.

FIG. 8 shows a flow chart of an illustrative process for recording and replacing based on preferred recording attributes. This example applies where advanced recording options have been activated for multiple recording attributes, and takes into account the possibility of that there may be more than one preferred attribute as well as attributes preferred in multiple copies. In step 801, the interactive media guidance application receives the advanced recording options. Then, in step 802, the interactive media guidance application searches the immediately available program listings for the desired program (e.g., the current database of listings stored in storage device 116 (FIG. 1)). If the program is not in the immediate program listings, the interactive media guidance application waits until listings are updated 810 and then searches for the program again 802. Once the interactive media guidance application finds a version of the program, it determines whether that version has all required recording attributes 803, e.g., any regular recording options, or any advanced recording options which are set to "required" as illustrated in 502 (FIG. 5). If the version does not possess all the required attributes, the interactive media guidance application returns to step 802 to determine if there are any other previously unconsidered versions of the desired program in the immediate program listings. If not, the interactive media guidance application returns to step 810 and waits until the program listings have been updated again. However, if the version does possess the required attributes, the interactive media guidance application then checks to see if any prior recordings of the program exist in step 804.

The first time a program is found, there will be no prior recordings, and therefore the interactive media guidance application will proceed to record the program in step 807. However, if the interactive media guidance application determines that there have been prior recordings in step 804, then it will proceed to determine whether the present version of the program is more preferred than the prior recordings in step 805. Only if the recording is more preferred in step 805, or a preferred multiple copy in step 806, will the interactive media guidance application proceed to record the program in step 807. Otherwise, the interactive media guidance application will again return to step 802 to determine if there are any other previously unconsidered versions of the desired program in the immediate program listings. If not, the interactive media guidance application returns to step 810 and waits until the program listings have been updated again.

After a program is recorded in step 807, the interactive media guidance application will delete the less-preferred prior recording in step 808, i.e. will replace the prior recording with the newer more-preferred recording. The interactive media guidance application will then determine in step 809 if the current recording is the most preferred, or optimal, version. Similarly, if an attribute is preferred in multiple copies, the interactive media guidance application will determine in step 809, for each variant of the attribute which is preferred in multiple copies, whether the preferred multiple copy having that variant is the most preferred version with respect to its other recording attributes. Where the optimal copy or copies have been recorded, the interactive media guidance application will proceed to step 811 and stop searching for the desired program. However, where the optimal copy or copies have not all been recorded, the interactive media guidance application will return to step 802 to determine if there are any other previously unconsidered versions of the desired program in the immediate program listings. If not, the interactive media guidance application returns to step 810 and waits until the program listings have been updated again.

FIG. 8 is only meant to show one embodiment of the present invention. As noted above, the steps may be rearranged in several different ways to achieve the same result. For example, steps 807 and 808 may be combined so as to record the new version directly on top of the prior recording. Similarly, step 802 may take required recording attributes into account, thereby obviating the need for step 803. If user equipment 110 includes multiple tuners, steps may be performed in parallel. Additionally, in some embodiments, before an optimal copy or copies has been obtained, the user may be given the choice to either continue or stop recording more-preferred versions.

The above processes for recording and replacing based on preferred recording attributes, may apply to an individual program or a series. When applied to a series, steps 801-811 would be executed separately for each episode of the series. In addition, in any of the above processes, if a recording is made, it may be recorded on storage device 116, on a remote storage (e.g., network DVR), or any other suitable location.

Figure 9:
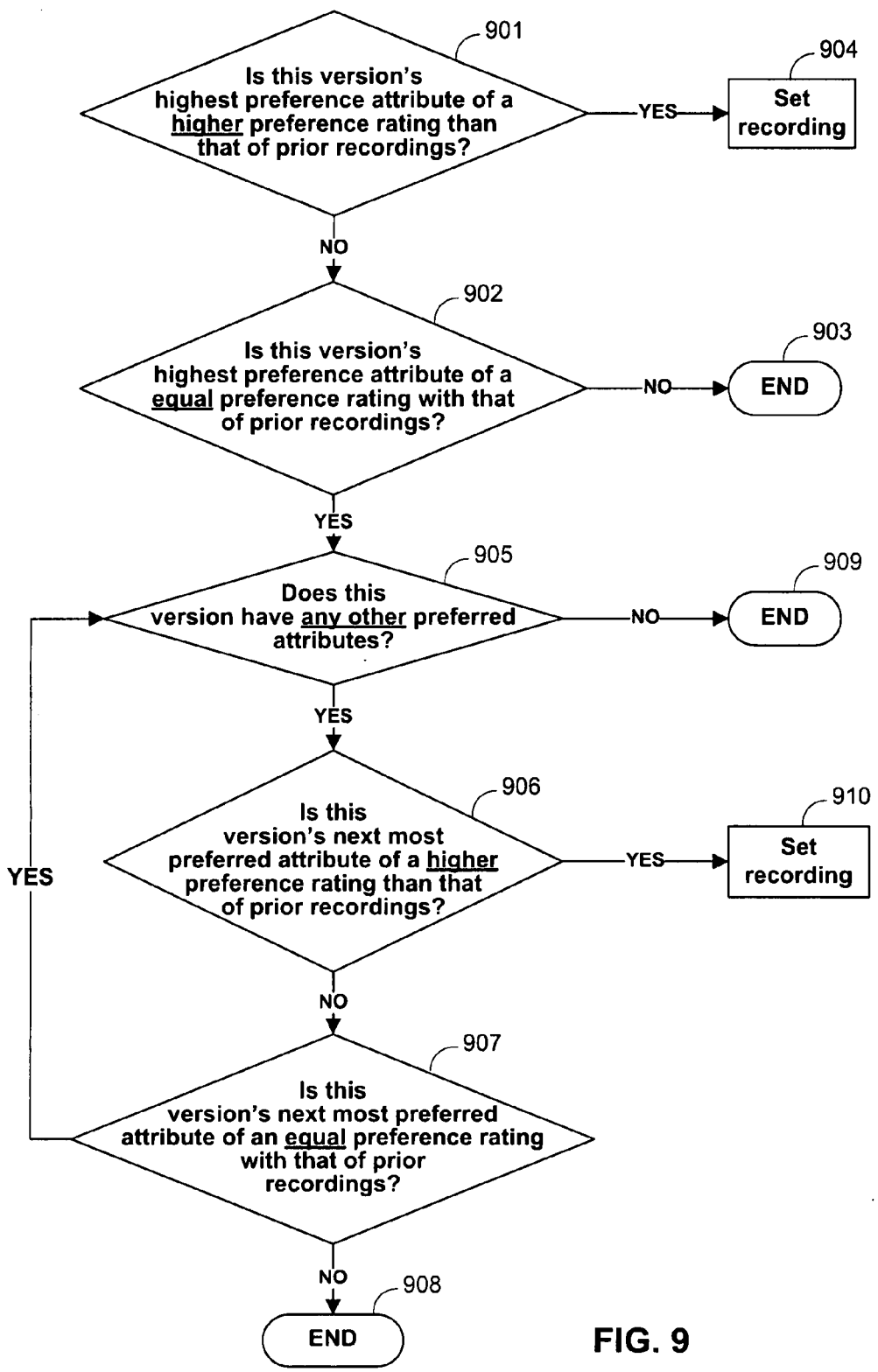
FIG. 9 shows a flow chart of an illustrative process for determining which version of a program is more preferred, in accordance with one embodiment of the present invention.

FIG. 9 shows a flow chart of an illustrative process for determining whether one version of a program is more preferred than prior recordings. In step 901, the interactive media guidance application compares the highest preference attribute of the present version with that of the prior recording or recordings, i.e. if the present version has the attribute with preference "1," it would be more preferred than a prior recording which only has the attribute with preference "2." If the present version's highest preference attribute is of a higher ranking than that of the prior recording or recordings, then the interactive media guidance application will set to record the present version in step 904. Otherwise, the interactive media guidance application will then determine 902 whether the present version's highest preference attribute is equal to that of the prior recording or recordings. If not, this version is less preferred than prior recordings, and the interactive media guidance application will stop its comparison 903.

If the present version's highest preference attribute is of equal rank to that of the prior recording or recordings, the interactive media guidance application will then determine 905 if the present recording has any other preferred attributes. If not, then the prior recordings are at least of equal preference to the present version, and there is no need to record the present version and the interactive media guidance application will stop its comparison 909. However, if the present version does possess other preferred attributes, the interactive media guidance application will repeat the same comparisons for the next most preferred attribute starting with step 906.

In step 906, the interactive media guidance application compares the next most preferred attribute of the present version with that of the prior recording or recordings. If the present version's next most preferred attribute is of a higher ranking than that of the prior recording or recordings, then the interactive media guidance application will set to record the present version in step 910. Otherwise, the interactive media guidance application will then determine 907 whether the present version's next most preferred attribute is equal to that of the prior recording or recordings. If not, this version is less preferred than prior recordings, and the interactive media guidance application will stop its comparison 908.

If the present version's highest preference attribute is of equal rank to that of the prior recording or recordings, the interactive media guidance application will return to step 905 to determine if the present recording has any other preferred attributes. The interactive media guidance application will repeat this process until it determines that the present version is more preferred than the prior recording or recordings 910, less preferred 908, or there are no more preferred attributes to compare 909.

The above processes for determining whether one version of a program is more preferred than prior recordings, may apply to an individual program or a series. When applied to a series, steps 901-910 would be executed separately for each episode of the series. In addition, in any of the above processes, if a recording is made, it may be recorded on storage device 116, on a remote storage (e.g., network DVR), or any other suitable location.

The above described embodiments of the present invention are presented for purposes of illustration and not of limitation, and the present invention is limited only by the claims which follow. Furthermore, all of the flow charts and processes described above are illustrative. Steps may be added or removed to any of the flow charts, and steps may be performed in a different order.

What is claimed is:

1. A method for recording programs with an interactive media guidance application comprising:

receiving a user selection of a program for recording, the selection specifying a user preference to record the program with or without commercials;

retrieving media guidance information data for the program from memory;

following receipt of the user selection of the program for recording, automatically determining, from the media guidance application data, whether a version of the program matches the user preference; and when the version of the program is determined from the media guidance data to match the user preference, automatically scheduling a recording of the version of the program on a recording device in accordance with the user selection, when no version of the program is determined from the media guidance data to match the user preference, searching updated media guidance data for the version of the program that matches the user preference after the media guidance data is updated.

2. The method of claim 1 wherein the interactive media guidance application is an interactive television program guide implemented on a set-top box.

3. A method for recording programs with an interactive media guidance application comprising:

receiving a user selection of a program for recording, the selection specifying a user preference to record the program with a particular aspect ratio;

retrieving media guidance information data for the program from memory;

following receipt of the user selection of the program for recording, automatically determining, from the media guidance application data, whether a version of the program matches the user preference; and when the version of the program is determined from the media guidance data to match the user preference, automatically scheduling a recording of the version of the program on a recording device in accordance with the user selection, when no version of the program is determined from the media guidance data to match the user preference, searching updated media guidance data for the version of the program that matches the user preference after the media guidance data is updated.

4. The method of claim 3 wherein the interactive media guidance application is an interactive television program guide implemented on a set-top box.

5. A method for recording programs with an interactive media guidance application comprising:
- receiving a user selection of a program for recording, the selection specifying a user preference to record a director's cut of the program;
- retrieving media guidance information data for the program from memory;
- following receipt of the user selection of the program for recording, automatically determining, from the media guidance application data, whether a version of the program matches the user preference; and
- when the version of the program is determined from the media guidance data to match the user preference, automatically scheduling a recording of the version of the program on a recording device in accordance with the user selection,
- when no version of the program is determined from the media guidance data to match the user preference, searching updated media guidance data for the version of the program that matches the user preference after the media guidance data is updated.

6. The method of claim 5 wherein the interactive media guidance application is an interactive television program guide implemented on a set-top box.

7. A method for recording programs with an interactive media guidance application comprising:
- receiving a user selection of a program for recording, the selection specifying a user preference to record a rated or unrated version of the program;
- retrieving media guidance information data for the program from memory;
- following receipt of the user selection of the program for recording, automatically determining, from the media guidance application data, whether a version of the program matches the user preference; and
- when the version of the program is determined from the media guidance data to match the user preference, automatically scheduling a recording of the version of the program on a recording device in accordance with the user selection,
- when no version of the program is determined from the media guidance data to match the user preference, searching updated media guidance data for the version of the program that matches the user preference after the media guidance data is updated.

8. The method of claim 7 wherein the interactive media guidance application is an interactive television program guide implemented on a set-top box.

9. A method for recording programs with an interactive media guidance application comprising:
- receiving a user input from a user input device identifying a program to be recorded and allowing the user to select a first recording attribute as being either required, preferred, or preferred in multiple copies, and allowing the user to select a second recording attribute as being preferred, or preferred in multiple copies;
- retrieving media guidance information data for the program from memory;
- following receipt of the user input identifying the program to be recorded, automatically determining, from the media guidance application data, whether any versions of the program have all required program attributes in accordance with the user input;
- determining, from the media guidance application data, whether any versions of the program have one or more preferred program attributes in accordance with the user input;
- in response to the determination that a version of the program has all required program attributes, automatically recording on a recording device at least one version of the program with all required program attributes in accordance with the user input; and
- in response to the determination that a version of the program has one or more preferred program attributes, automatically recording on a recording device at least one additional version of the program with all required program attributes and at least one preferred program attribute of equal or greater preference when compared to any prior recorded version or versions of the program.

10. The method of claim 9, further comprising deleting any prior recorded version of a program with preferred program attributes of equal or lesser preference.

11. The method of claim 10, further comprising deleting any prior recorded version of a program with the same variant of a program attribute which is preferred in multiple copies, and with preferred program attributes of equal or lesser preference.

12. The method of claim 9, wherein receiving a user identification of a second attribute as being preferred, comprises allowing a user to rank the relative preference of a preferred attribute if more than one attribute is preferred.

13. The method of claim 9 wherein the interactive media guidance application continues searching for and recording versions of the program with all required program attributes, and at least one preferred program attribute of equal or greater preference when compared to any prior recorded version or versions, until the interactive media guidance application records a version of the program which possesses all required program attributes and all preferred program attributes.

14. The method of claim 9 wherein the interactive media guidance application is an interactive television program guide implemented on a set-top box.

15. The method of claim 9 wherein one of the preferred program attributes indicates that the user prefers a program version that does or does not include commercials.

16. The method of claim 9 wherein one of the preferred program attributes indicates that the user prefers multiple copies of a program, comprising at least one version which includes commercials and at least one version which does not include commercials.

17. The method of claim 9 wherein one of the preferred program attributes indicates that the user prefers that the program version have a particular aspect ratio.

18. The method of claim 9 wherein one of the preferred program attributes indicates that the user prefers multiple copies of a program, comprising at least one version with each available aspect ratio.

19. The method of claim 9 wherein one of the preferred program attributes indicates that the user prefers that the program version is or is not a director's cut.

20. The method of claim 9 wherein one of the preferred program attributes indicates that the user prefers multiple copies of a program, comprising at least one version which is a director's cut and at least one version which is not a director's cut.

21. The method of claim 9 wherein one of the preferred program attributes indicates that the user prefers that the program version is or is not unrated.

22. The method of claim 9 wherein one of the preferred program attributes indicates that the user prefers multiple copies of a program, comprising at least one version which is unrated and at least one version which is not unrated.

23. A system for recording programs with an interactive media guidance application comprising:

a user input device;
a recording device; and
control circuitry configured to:
- receive, with the user input device, a user selection of a program for recording, the selection specifying a user preference to record the program with or without commercials;
- retrieve media guidance information data for the program from memory;
- following receipt of the user selection of the program for recording, automatically determine, from the media guidance application data, whether a version of the program matches the user preference; and
- when the version of the program is determined from the media guidance data to match the user preference, automatically schedule a recording of the version of the program on the recording device in accordance with the user selection,
- when no version of the program is determined from the media guidance data to match the user preference, search updated media guidance data for the version of the program that matches the user preference after the media guidance data is updated.

24. The system of claim 23 wherein the interactive media guidance application is an interactive television program guide implemented on a set-top box.

25. A system for recording programs with an interactive media guidance application comprising:
a user input device;
a recording device; and
control circuitry configured to:
- receive, with the user input device, a user selection of a program for recording, the selection specifying a user preference to record the program with particular aspect ratio;
- retrieve media guidance information data for the program from memory;
- following receipt of the user selection of the program for recording, automatically determine, from the media guidance application data, whether a version of the program matches the user preference; and
- when the version of the program is determined from the media guidance data to match the user preference, automatically schedule a recording of the version of the program on the recording device in accordance with the user selection,
- when no version of the program is determined from the media guidance data to match the user preference, search updated media guidance data for the version of the program that matches the user preference after the media guidance data is updated.

26. The system of claim 25 wherein the interactive media guidance application is an interactive television program guide implemented on a set-top box.

27. A system for recording programs with an interactive media guidance application comprising:
a user input device;
a recording device; and
control circuitry configured to:
- receive, with the user input device, a user selection of a program for recording, the selection specifying a user preference to record a director's cut of the program;
- retrieve media guidance information data for the program from memory;
- following receipt of the user selection of the program for recording, automatically determine, from the media guidance application data, whether a version of the program matches the user preference; and
- when the version of the program is determined from the media guidance data to match the user preference, automatically schedule a recording of the version of the program on the recording device in accordance with the user selection,
- when no version of the program is determined from the media guidance data to match the user preference, search updated media guidance data for the version of the program that matches the user preference after the media guidance data is updated.

28. The system of claim 27 wherein the interactive media guidance application is an interactive television program guide implemented on a set-top box.

29. A system for recording programs with an interactive media guidance application comprising:
a user input device;
a recording device; and
control circuitry configured to:
- receive, with the user input device, a user selection of a program for recording, the selection specifying a user preference to record a rated or unrated version of the program;
- retrieve media guidance information data for the program from memory;
- determine, after the user selection is received, from the media guidance application data, whether a version of the program matches the user preference; and
- when the version of the program is determined from the media guidance data to match the user preference, record the version of the program on the recording device in accordance with the user selection,
- when no version of the program is determined from the media guidance data to match the user preference, search updated media guidance data for the version of the program that matches the user preference after the media guidance data is updated.

30. The system of claim 29 wherein the interactive media guidance application is an interactive television program guide implemented on a set-top box.

31. A system for recording programs with an interactive media guidance application comprising:
a user input device;
a recording device; and
control circuitry configured to:
- receive a user input from the user input device identifying a program to be recorded and allowing the user to select a first recording attribute as being either required, preferred, or preferred in multiple copies, and allowing the user to select a second recording attribute as being preferred, or preferred in multiple copies;
- retrieve media guidance information data for the program from memory;
- following receipt of the user input identifying the program to be recorded, automatically determine, from the media guidance application data, whether any versions of the program have all required program attributes in accordance with the user input;
- determine, from the media guidance application data, whether any versions of the program have one or more preferred program attributes in accordance with the user input;
- in response to the determination that a version of the program has all required program attributes, automatically record on the recording device at least one version of the program with all required program attributes in accordance with the user input; and in response to the determination that a version of the program has one or more preferred program attributes, automatically record on the recording device at least one additional version of the program with all required program attributes and at least one preferred program attribute of equal or greater preference when compared to any prior recorded version or versions of the program.

32. The system of claim 31, the control circuitry further configured to delete any prior recorded version of a program with preferred program attributes of equal or lesser preference.

33. The system of claim 32, the control circuitry further configured to delete any prior recorded version of a program with the same variant of a program attribute which is preferred in multiple copies, and with preferred program attributes of equal or lesser preference.

34. The system of claim 31, the control circuitry further configured to receive a user identification designating a rank indicating the relative preference of a preferred attribute if more than one attribute is preferred.

35. The system of claim 31, the control circuitry further configured to continue searching for and recording versions of the program with all required program attributes, and at least one preferred program attribute of equal or greater preference when compared to any prior recorded version or versions, until the interactive media guidance application records a version of the program which possesses all required program attributes and all preferred program attributes.

36. The system of claim 31, wherein the interactive media guidance application is an interactive television program guide implemented on a set-top box.

37. The system of claim 31, the control circuitry further configured to receive a user input from the user input device designating that the user prefers a program version that does or does not include commercials.

38. The system of claim 31, the control circuitry further configured to receive a user input from the user input device indicating that the user prefers multiple copies of a program, comprising at least one version which includes commercials and at least one version which does not include commercials.

39. The system of claim 31, the control circuitry further configured to receive a user input from the user input device designating that the user prefers a program version that has a particular aspect ratio.

40. The system of claim 31, the control circuitry further configured to receive a user input from the user input device indicating that the user prefers multiple copies of a program, comprising at least one version with each available aspect ratio.

41. The system of claim 31, the control circuitry further configured to receive a user input from the user input device designating that the user prefers a program version that is or is not a director's cut.

42. The system of claim 31, the control circuitry further configured to receive a user input from the user input device indicating that the user prefers multiple copies of a program, comprising at least one version which is a director's cut and at least one version which is not a director's cut.

43. The system of claim 31, the control circuitry further configured to receive a user input from the user input device designating that the user prefers a program version that is or is not unrated.

44. The system of claim 31, the control circuitry further configured to receive a user input from the user input device indicating that the user prefers multiple copies of a program, comprising at least one version which is unrated and at least one version which is not unrated.

* * * * *

UNITED STATES PATENT AND TRADEMARK OFFICE
CERTIFICATE OF CORRECTION

| | | |
|---|---|---|
| PATENT NO. | : 8,542,984 B1 | Page 1 of 1 |
| APPLICATION NO. | : 11/784120 | |
| DATED | : September 24, 2013 | |
| INVENTOR(S) | : Knee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this
Seventeenth Day of February, 2015

Michelle K. Lee
*Deputy Director of the United States Patent and Trademark Office*